(12) United States Patent
Kim et al.

(10) Patent No.: US 9,952,475 B2
(45) Date of Patent: Apr. 24, 2018

(54) LIQUID CRYSTAL DISPLAY DEVICE

(71) Applicant: SAMSUNG DISPLAY CO., LTD., Yongin-si, Gyeonggi-do (KR)

(72) Inventors: Keunwoo Kim, Seongnam-si (KR); Gunwoo Yang, Jinju-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 4 days.

(21) Appl. No.: 15/072,849

(22) Filed: Mar. 17, 2016

(65) Prior Publication Data
US 2016/0342005 A1 Nov. 24, 2016

(30) Foreign Application Priority Data
May 22, 2015 (KR) .......... 10-2015-0071431

(51) Int. Cl.
*G02F 1/1343* (2006.01)
*G02F 1/1362* (2006.01)
*G02F 1/1368* (2006.01)

(52) U.S. Cl.
CPC ........ *G02F 1/13624* (2013.01); *G02F 1/1368* (2013.01); *G02F 1/136286* (2013.01); *G02F 2001/134345* (2013.01)

(58) Field of Classification Search
CPC ........... G02F 2001/1676; G02F 1/1368; G02F 1/133707; G02F 1/13624; G02F 2001/134345; G02F 2201/40; G02F 2001/1552; G09G 2300/0809
See application file for complete search history.

(56) References Cited

U.S. PATENT DOCUMENTS

| 9,086,601 | B2 | 7/2015 | Jeong et al. |
| 2007/0126940 | A1* | 6/2007 | Lee ............... G02F 1/13624 349/38 |
| 2010/0053488 | A1 | 3/2010 | Kim et al. |
| 2011/0101436 | A1* | 5/2011 | Yamazaki ......... H01L 29/78609 257/315 |
| 2013/0242239 | A1 | 9/2013 | Chang et al. |

(Continued)

FOREIGN PATENT DOCUMENTS

| KR | 20100024639 A | 3/2010 |
| KR | 20130027370 A | 3/2013 |
| KR | 20130104521 A | 9/2013 |

OTHER PUBLICATIONS

Yi-Pai Huang et al., "18.3: Additional Refresh Technology (ART) of Advanced-MVA(AMVA) Mode for High Quality LCDs", SID, (2007), pp. 1010-1013.

*Primary Examiner* — Michael Caley
*Assistant Examiner* — Jonathan Y Jung
(74) *Attorney, Agent, or Firm* — Cantor Colburn LLP

(57) ABSTRACT

A liquid crystal display which enhances an aperture ratio and stabilizes a storage voltage includes a first substrate, a second substrate opposing the first substrate, a liquid crystal layer between the first substrate and the second substrate, a gate line, a data line, a first sub-pixel electrode, and a second sub-pixel electrode on the first substrate, a first transistor connected to the gate line, the data line, and the first sub-pixel electrode, and a second transistor connected to the gate line, the data line, and the second sub-pixel electrode and including a source electrode, a drain electrode and at least one floating electrode between the source electrode and the drain electrode.

19 Claims, 11 Drawing Sheets

(56) References Cited

U.S. PATENT DOCUMENTS

2016/0005769 A1\* 1/2016 Uramoto ........... H01L 29/78645
349/46
2017/0108723 A1\* 4/2017 No ........................ G02F 1/1368

\* cited by examiner

LIQUID CRYSTAL DISPLAY DEVICE

This application claims priority to Korean Patent Application No. 10-2015-0071431, filed on May 22, 2015, and all the benefits accruing therefrom under 35 U.S.C. § 119, the content of which in its entirety is herein incorporated by reference.

BACKGROUND

1. Field

Exemplary embodiments of the invention relate to a liquid crystal display ("LCD") device having an enhanced aperture ratio and being capable of stabilizing a storage voltage.

2. Description of the Related Art

An LCD device is a type of a flat panel display ("FPD"), which has found wide recent applications. The LCD device includes two substrates including electrodes formed thereon and a liquid crystal layer interposed therebetween. Upon applying voltage to the two electrodes, liquid crystal molecules of the liquid crystal layer are rearranged, thereby adjusting an amount of transmitted light.

In an attempt to improve visibility, each pixel may include two separate sub-pixel electrodes. In this case, data signals having different voltage levels need to be applied to the respective sub-pixel electrodes, and thus a data signal is applied to one of the two sub-pixel electrodes without modulation, while a data signal is divided and applied to the other of the two sub-pixel electrodes. To this end, a pixel includes a voltage-dividing transistor.

SUMMARY

Since a voltage-dividing transistor occupies a portion of a pixel region, an aperture ratio of a pixel may decrease. In addition, in a case where the voltage-dividing transistor is turned on, a data line and a storage line are electrically connected, and thus a storage voltage of a storage electrode may vary due to the data signal.

Exemplary embodiments of the invention are directed to a liquid crystal display ("LCD") device capable of increasing an aperture ratio of a pixel and efficiently reducing variation of a storage voltage.

According to an exemplary embodiment of the invention, an LCD device includes: a first substrate, a second substrate opposing the first substrate, a liquid crystal layer between the first substrate and the second substrate, a gate line, a data line, a first sub-pixel electrode, and a second sub-pixel electrode on the first substrate, a first transistor connected to the gate line, the data line, and the first sub-pixel electrode, and a second transistor connected to the gate line, the data line, and the second sub-pixel electrode and including a source electrode, a drain electrode and at least one floating electrode between the source electrode and the drain electrode.

In an exemplary embodiment, a plurality of floating electrodes separated from each other may be disposed between the source electrode and the drain electrode.

In an exemplary embodiment, the plurality of floating electrodes may be arranged in a line between the source electrode and the drain electrode.

In an exemplary embodiment, one of the plurality of floating electrodes, more than at least another of the plurality of floating electrodes, may be disposed adjacent to the source electrode.

In an exemplary embodiment, at least two of the plurality of floating electrodes may have sizes different from each other.

In an exemplary embodiment, the plurality of floating electrodes may have a greater size, as being disposed closer to one of the source electrode and the drain electrode.

In an exemplary embodiment, an interval between one of the plurality of floating electrodes and another of the plurality of floating electrodes may be different from an interval between the one of the plurality of floating electrodes and another of the plurality of floating electrodes.

In an exemplary embodiment, a pair of the floating electrodes may have a greater interval, as being disposed closer to one of the source electrode and the drain electrode.

In an exemplary embodiment, the floating electrode may overlap a semiconductor layer of the second transistor.

In an exemplary embodiment, the first transistor and the second transistor may share the source electrode.

In an exemplary embodiment, the source electrode may be one of a U-shape and an I-shape.

In an exemplary embodiment, a curved portion of the source electrode having a U-shape may face the second sub-pixel electrode.

In an exemplary embodiment, a connecting portion between the first transistor and the first sub-pixel electrode may be disposed between the gate line and the first sub-pixel electrode.

In an exemplary embodiment, a connecting portion between the second transistor and the second sub-pixel electrode may be disposed between the gate line and the second sub-pixel electrode.

In an exemplary embodiment, a connecting portion between the second transistor and the second sub-pixel electrode may be disposed between the gate line and the first sub-pixel electrode.

In an exemplary embodiment, the LCD device may further include a first storage electrode along at least one side of the first sub-pixel electrode.

In an exemplary embodiment, to LCD device may further include a second storage electrode along at least one side of the second sub-pixel electrode.

In an exemplary embodiment, the first sub-pixel electrode may include: a first stem electrode, and a first branch electrode extending from the first stem electrode.

In an exemplary embodiment, the second sub-pixel electrode may include: a second stem electrode, and a second branch electrode extending from the second stem electrode.

BRIEF DESCRIPTION OF THE DRAWINGS

The above and other features and exemplary embodiments of the invention will be more clearly understood from the following detailed description taken in conjunction with the accompanying drawings, in which.

DETAILED DESCRIPTION

Figure 1:
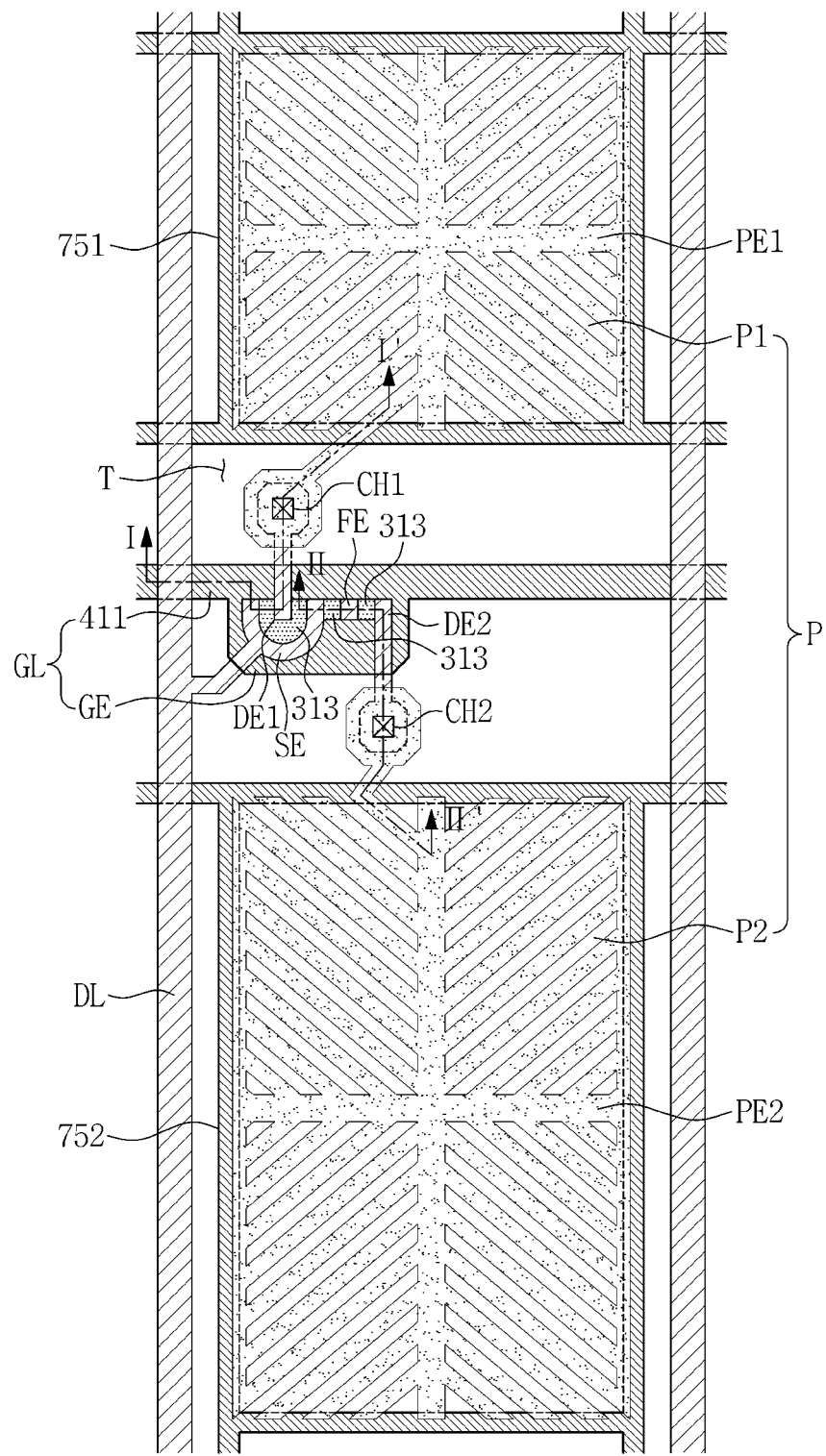
FIG. 1 is a plan view illustrating one exemplary embodiment of a pixel provided in a liquid crystal display ("LCD") device.

In the drawings, certain elements or shapes may be simplified or exaggerated to better illustrate the invention, and other elements in an actual product may also be omitted. Like reference numerals refer to like elements throughout the specification. It will be understood that when an element such as a layer, film, region, or substrate is referred to as being "on" another element, it can be directly "on" the other element or intervening elements may also be present. In contrast, when an element is referred to as being "directly on" another element, there are no intervening elements present. In addition, it will be understood that when an element such as a layer, film, region, or substrate is referred to as being "below" another element, it can be directly "below" the other element or intervening elements may also be present. In contrast, when an element is referred to as being "directly below" another element, there are no intervening elements present.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Figure 2:
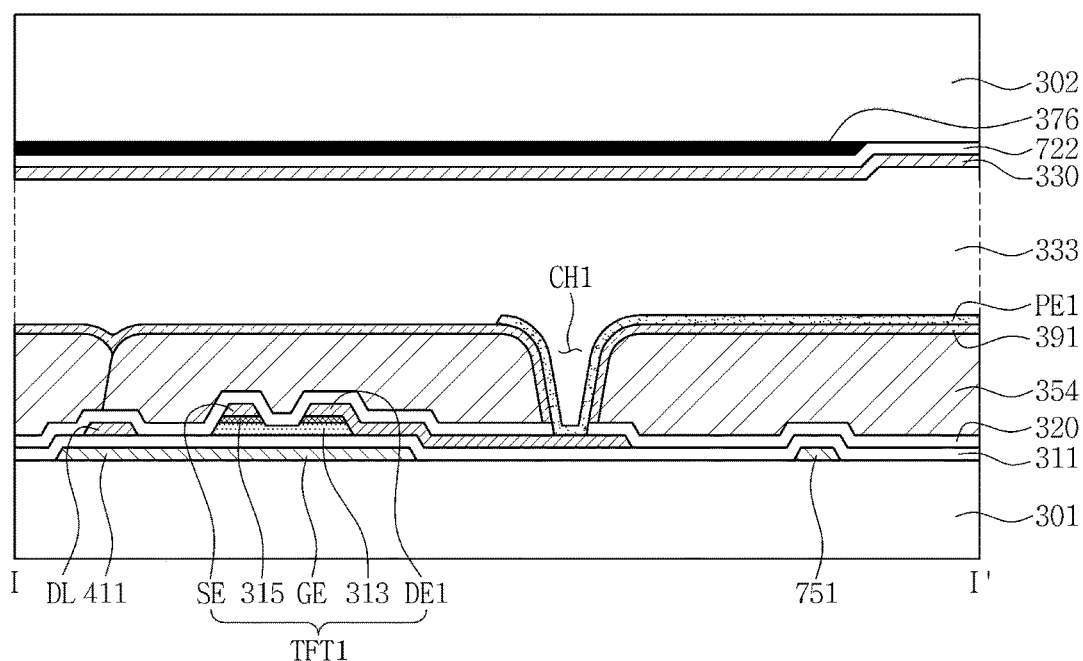
FIG. 2 is a cross-sectional view taken along line I-I' of FIG. 1.
Figure 3:
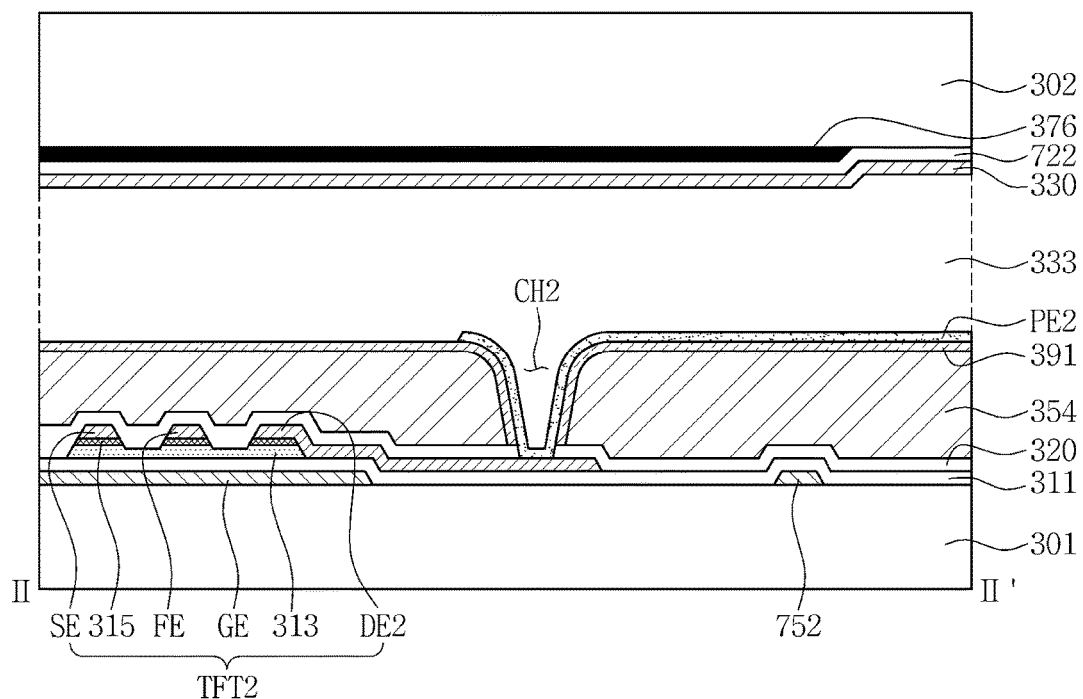
FIG. 3 is a cross-sectional view taken along line II-II' of FIG. 1.

FIG. 1 is a plan view illustrating a pixel provided in a liquid crystal display ("LCD") device according to an exemplary embodiment, FIG. 2 is a cross-sectional view taken along line I-I' of FIG. 1, and FIG. 3 is a cross-sectional view taken along line II-II' of FIG. 1.

The pixel P, as illustrated in FIGS. 1, 2, and 3, includes a first substrate 301, a second substrate 302, a first thin film transistor ("transistor") TFT1, a second transistor TFT2, a first storage electrode 751, a second storage electrode 752, a color filter 354, a first sub-pixel electrode PE1, a second sub-pixel electrode PE2, a light shielding layer 376, an overcoat layer 722, a common electrode 330, and a liquid crystal layer 333. Herein, the first transistor TFT1, as illustrated in FIGS. 1 and 2, includes a gate electrode GE, a semiconductor layer 313, a source electrode SE, and a drain electrode DE1. Further, the second transistor TFT2, as illustrated in FIGS. 1 and 3, includes a gate electrode GE, a semiconductor layer 313, a source electrode SE, a second drain electrode DE2, and a floating electrode FE.

As illustrated in FIGS. 1 and 3, the gate line GL is disposed on the first substrate 301. In an exemplary embodiment, the gate line GL, in particular, may be disposed in a transistor region T of the first substrate 301. The transistor region T may be positioned between a first sub-pixel region P1 and a second sub-pixel region P2.

The gate line GL includes a line portion 411 and an electrode portion GE, each having different line widths from each other. In an exemplary embodiment, the electrode portion GE may have a greater line width than a line width of the line portion 411. The line portion 411 and the electrode portion GE are unitary. The electrode portion GE corresponds to a gate electrode of the first transistor TFT1 and second transistor TFT2. Although not illustrated, the gate line GL may have a connecting portion (e.g., an end portion) that is greater than other portions thereof in size, so as to be properly connected to another layer or external driving circuits.

In an exemplary embodiment, the gate line GL may include at least one metal of aluminum (Al) or alloys thereof, silver (Ag) or alloys thereof, copper (Cu) or alloys thereof, and/or molybdenum (Mo) or alloys thereof, for example. In an exemplary embodiment, the gate line GL may include one of chromium (Cr), tantalum (Ta), and titanium (Ti), for example. In exemplary embodiments, the gate line GL may have a multi-layer structure including at least two conductive layers having different physical properties.

The first storage electrode 751 encloses the first sub-pixel electrode PE1. In this case, the first storage electrode 751 overlaps an edge portion of the first sub-pixel electrode PE1. The first storage line 751 may also include the same material and have the same structure (multi-layer structure) as those of the gate line GL. In other words, the gate line GL and the first storage electrode 751 may be simultaneously provided in the same process. A storage voltage is applied to the first storage electrode 751. In an exemplary embodiment, the storage voltage may correspond to a common voltage, for example.

The second storage electrode 752 encloses the second sub-pixel electrode PE2. In this case, the second storage electrode 752 overlaps an edge portion of the second sub-pixel electrode PE2. The second storage line 752 may also include the same material and have the same structure (e.g., multi-layer structure) as those of the gate line GL. In other words, the gate line GL and the second storage line 752 may be simultaneously provided in the same process. A storage voltage is applied to the second storage electrode 752. In an exemplary embodiment, the storage voltage may correspond to a common voltage. The second storage electrode 752 and the first storage electrode 751 may be unitary.

The gate insulating layer 311 is disposed on the gate line GL, the first storage electrode 751, and the second storage electrode 752. In this case, the gate insulating layer 311 is disposed over an entire surface of the first substrate 301 including the gate line GL, the first storage electrode 751, and the second storage electrode 752. In an exemplary embodiment, the gate insulating layer 311 may include, for example, silicon nitride ($SiN_x$), silicon oxide ($SiO_x$), or the like, for example. In an exemplary embodiment, the gate insulating layer 311 may have a multi-layer structure including at least two insulating layers having different physical properties.

The semiconductor layer 313 is disposed on the gate insulating layer 311. In this case, the semiconductor layer 313 overlaps the electrode portion GE of the gate line, that is, at least a portion of the gate electrode GE. In an exemplary embodiment, the semiconductor layer 313 may include amorphous silicon, polycrystalline silicon, or the like, for example.

An ohmic contact layer 315 is disposed on the semiconductor layer 313. In an exemplary embodiment, the ohmic contact layer 315 may include silicide or n+ hydrogenated amorphous silicon doped with n-type impurities, such as phosphorus, at high concentration. The ohmic contact layer 315 may be disposed in pairs on the semiconductor layer 131.

The source electrode SE, the first drain electrode DE1, the second drain electrode DE2, and the floating electrode FE are disposed on the ohmic contact layer 315.

The source electrode SE extends from the data line DL. In an exemplary embodiment, as illustrated in FIG. 1, the source electrode SE has a shape protruding from the data line DL to the gate electrode GE, for example. In this case, the source electrode SE may have a shape enclosing a portion of the first drain electrode DE1. The source electrode SE overlaps the semiconductor layer 313 and the gate electrode GE. In this case, the source electrode SE may further overlap the line portion 411. In an exemplary embodiment, the source electrode SE may have one of a C-shape, a U-shape, and an I-shape, for example. FIG. 1 illustrates the source electrode SE having a U-shape by way of example, and a curved portion of the source electrode SE faces the second sub-pixel electrode PE2.

In exemplary embodiments, the source electrode SE, in particular, includes refractory metal, such as molybdenum, chromium, tantalum and titanium, or a metal alloy thereof, and may have a multi-layer structure including a refractory metal layer and a low-resistance conductive layer. Examples of the multi-layer structure may include: a double-layer structure including a chromium or molybdenum (alloy) lower layer and an aluminum (alloy) upper layer, and a triple-layer structure including a molybdenum (alloy) lower layer, an aluminum (alloy) intermediate layer, and a molybdenum (alloy) upper layer. Further, the source electrode SE may include various metals or conductors rather than the aforementioned materials.

A side of the first drain electrode DE1 is disposed on the gate electrode GE. The side of the first drain electrode DE1 overlaps the gate electrode GE and the semiconductor layer 313. Another side of the first drain electrode DE1 is connected to the first sub-pixel electrode PE1.

The first drain electrode DE1 may include same material and have the same structure (multi-layer structure) as those of the source electrode SE. In other words, the first drain electrode DE1 and the source electrode SE may be simultaneously provided in the same process.

The gate electrode GE, the source electrode SE, and the first drain electrode DE1, along with the semiconductor layer 313 and the ohmic contact layer 315, provide the first transistor TFT1. In this case, a channel of the first transistor TFT1 is positioned on a portion of the semiconductor layer 313 between the source electrode SE and the first drain electrode DE1. In an exemplary embodiment, the portion of the semiconductor layer 313 corresponding to the channel may have a thickness less than a thickness of other portions of the semiconductor layer 313.

A side of the second drain electrode DE2 is disposed on the gate electrode GE. The side of the second drain electrode DE2 overlaps the gate electrode GE and the semiconductor layer 313. Another side of the second drain electrode DE2 is connected to the second sub-pixel electrode PE2.

The second drain electrode DE2 may include the same material and have the same structure (multi-layer structure) as those of the source electrode SE. In other words, the second drain electrode DE2 and the source electrode SE may be simultaneously provided in the same process.

The floating electrode FE is disposed on a portion of the semiconductor layer 313 between the source electrode SE and the second drain electrode DE2. The floating electrode FE overlaps the gate electrode GE.

The floating electrode FE may include the same material and have the same structure (multi-layer structure) as those of the source electrode SE. In other words, the floating electrode FE and the source electrode SE may be simultaneously provided in the same process.

The gate electrode GE, the source electrode SE, the second drain electrode DE2, and the floating electrode FE, along with the semiconductor layer 313 and the ohmic contact layer 315, provide the second transistor TFT2. In this case, a channel of the second transistor TFT2 is positioned on a portion of the semiconductor layer 313 between the source electrode SE and the floating electrode FE and a portion of the semiconductor layer 313 between the floating electrode FE and the second drain electrode DE2. In an exemplary embodiment, the portion of the semiconductor layer 313 corresponding to the channel may have a thickness less than the thickness of other portions of the semiconductor layer 313.

The data line DL is disposed on the gate insulating layer 311. Although not illustrated, the data line DL may have a connecting portion (e.g., an end portion) which is greater than other portions thereof in size, so as to be properly connected to another layer or external driving circuits.

The data line DL intersects the gate line GL, the first storage electrode 751, and the second storage electrode 752. Although not illustrated, in an exemplary embodiment, the data line DL may have a smaller line width in a portion at which the data line DL intersects the gate line GL than a line width of other portions of the data line DL. Likewise, the data line DL may have a smaller line width in a portion at which the data line DL intersects one of the first storage electrode 751 and the second storage electrode 752 than the line width of other portions of the data line DL. Accordingly, parasitic capacitance between the data line DL and the gate line GL and capacitance between the data line DL and one of the first storage electrode 751 and the second storage electrode 752 may decrease. The data line DL may include the same material and have the same structure (multi-layer structure) as those of the source electrode SE. In other words, the data line DL and the source electrode SE may be simultaneously provided in the same process.

A passivation layer 320 is disposed on the data line DL, the source electrode SE, the first drain electrode DE1, the second drain electrode DE2, and the floating electrode FE. In this case, the passivation layer 320 is disposed over an entire surface of the first substrate 301 including the data line DL, the source electrode SE, the first drain electrode DE1, the second drain electrode DE2, and the floating electrode FE.

In an exemplary embodiment, the passivation layer 320 may include, for example, an inorganic insulating material such as silicon nitride ($SiN_x$) and silicon oxide ($SiO_x$). When the passivation layer 320 includes an inorganic insulating material, an inorganic insulating material having photosensitivity and having a dielectric constant of about 4.0 may be used, for example. In exemplary embodiments, the passivation layer 320 may have a double-layer structure including a lower inorganic layer and an upper organic layer, which has been found to impart desirable insulating properties and also to prevent damage to exposed portions of the semiconductor layer 313. As examples, the passivation layer 320 may have a thickness greater than or equal to about 5000 angstroms (Å), or in a range of about 6000 Å to about 8000 Å.

A lower contact hole may be defined through the passivation layer 320, and a portion of the first drain electrode DE1 and a portion of the second drain electrode DE2 may be exposed through the lower contact hole, respectively.

As illustrated in FIGS. 2 and 3, the color filter 354 is disposed on the passivation layer 320. The color filter 354 is disposed in the first sub-pixel region P1 and the second sub-pixel region P2, and in this case, an edge portion of the color filter 354 is disposed on the gate line GL, the first transistor TFT1, the second transistor TFT2, and the data line DL. However, the color filter 354 may not overlap a connecting portion between the first drain electrode DE1 and the first sub-pixel electrode PE1 and a connecting portion between the second drain electrode DE2 and the second sub-pixel electrode PE2. That is, the color filter 354 is not disposed on a portion of the passivation layer 350 corresponding to the connecting portions. An edge portion of the color filter 354 may overlap an edge portion of another color filter 354 adjacent thereto. In an exemplary embodiment, the color filter 354 may include a photosensitive organic material. A color filter having the same color is disposed in the first sub-pixel region P1 and the second sub-pixel region P2 which provide a pixel region.

A capping layer 391 is disposed on the color filter 354. The capping layer 391 is configured to prevent infiltration of undesirable materials provided in the color filter 354 into the liquid crystal layer 333. In an exemplary embodiment, the capping layer 391 may include silicon nitride or silicon oxide, for example. Upper contact holes are defined through the capping layer 391, and one of the upper contact holes is positioned directly on the lower contact hole through which the first drain electrode DE1 is exposed. The one of the upper contact holes and the lower contact hole are connected to thereby define a first drain contact hole CH1. Another of the upper contact holes is positioned directly on the lower contact hole through which the second drain electrode DE2 is exposed. The another of the upper contact holes and the lower contact hole are connected to thereby provide a second drain contact hole CH2.

The first sub-pixel electrode PE1 is disposed in the first sub-pixel region P1. In this case, as illustrated in FIG. 2, the first sub-pixel electrode PE1 is disposed on the capping layer 391. The first sub-pixel electrode PE1 is connected to the first drain electrode DE1 through the first drain contact hole CH1. In an exemplary embodiment, the first sub-pixel electrode PE1 may include a transparent conductive material, such as indium tin oxide ("ITO") or indium zinc oxide ("IZO"). In the exemplary embodiment, ITO may be a polycrystalline or monocrystalline material, and IZO may be a polycrystalline or monocrystalline material, for example.

Hereinafter, in reference to FIG. 4, the first sub-pixel electrode PE1 will be described in detail hereinbelow.

Figure 4:
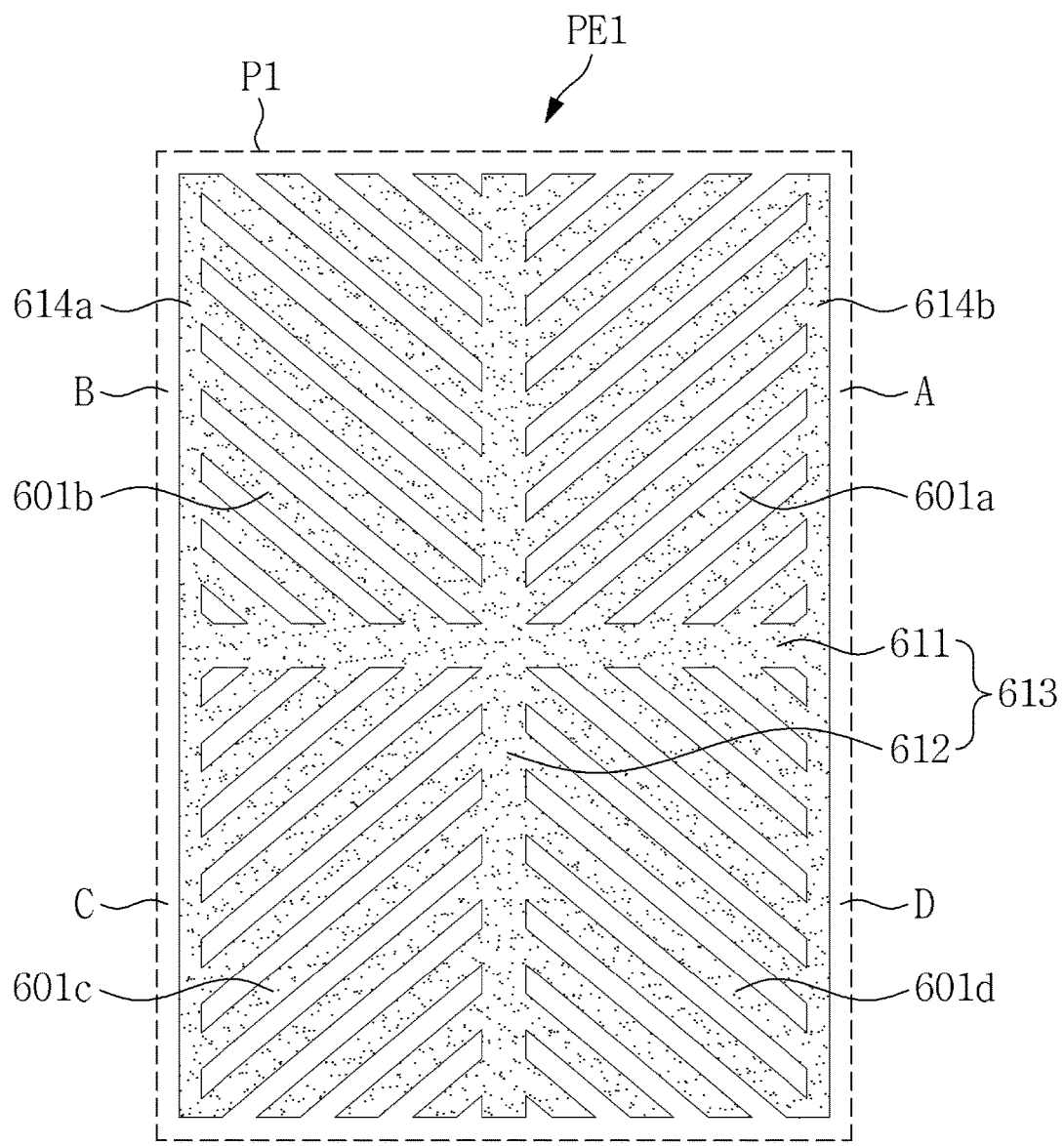
FIG. 4 is a view separately illustrating a first sub-pixel electrode of FIG. 1.

FIG. 4 is a view separately illustrating the first sub-pixel electrode PE1 of FIG. 1.

The first sub-pixel electrode PE1, as illustrated in FIG. 4, includes a stem electrode 613 and a plurality of branch electrodes 601*a*, 601*b*, 601*c*, and 601*d*. The stem electrode 613 and the branch electrodes 601*a*, 601*b*, 601*c*, and 601*d* may be unitary.

The stem electrode 613 divides the first sub-pixel region P1 into a plurality of domains. In an exemplary embodiment, the stem electrode 613 includes a horizontal portion 611 and a vertical portion 612 intersecting each other, for example. The horizontal portion 611 divides the first sub-pixel region P1 into two domains, and the vertical portion 612 partitions each of the divided two domains into another two smaller domains. The first sub-pixel region P1 may be divided into four domains A, B, C, and D by the stem electrode 613 including the horizontal portion 611 and the vertical portion 612.

The branch electrodes 601*a*, 601*b*, 601*c*, and 601*d* may include first, second, third, and fourth branch electrodes 601*a*, 601*b*, 601*c*, and 601*d* each extending from the stem electrode 613 into directions different from each other. In other words, the first, second, third, and fourth branch electrodes 601*a*, 601*b*, 601*c*, and 601*d* may extend from the stem electrode 613 into the domains A, B, C, and D, respectively. In an exemplary embodiment, the first branch electrode 601*a* may be disposed in the first domain A, the second branch electrode 601*b* may be disposed in the second domain B, the third branch electrode 601*c* may be disposed in the third domain C, and the fourth branch electrode 601*d* may be disposed in the fourth domain D, for example.

The first branch electrode 601*a* and the second branch electrode 601*b* may have a symmetrical shape with respect to the vertical portion 612, and the third branch electrode 601*c* and the fourth branch electrode 601*d* may have a symmetrical shape with respect to the vertical portion 612. Further, the first branch electrode 601*a* and the fourth branch electrode 601*d* may have a symmetrical shape with respect to the horizontal portion 611, and the second branch electrode 601*b* and the third branch electrode 601*c* may have a symmetrical shape with respect to the horizontal portion 611.

The first branch electrodes 601*a* may be provided in plural in the first domain A, and in this case, the plurality of first branch electrodes 601*a* may be aligned parallel to each other. In this regard, a part of the first branch electrodes 601*a* may extend from a side of the horizontal portion 611, which contacts the first domain A, in a diagonal direction (e.g., upper right direction) with respect to the side thereof. Further, the rest of the first branch electrodes 601a extend from a side of the vertical portion 612, which contacts the first domain A, in a diagonal direction with respect to the side thereof.

The second branch electrodes 601b may be provided in plural in the second domain B, and in this case, the plurality of second branch electrodes 601b may be aligned parallel to each other. In this regard, a part of the second branch electrodes 601b may extend from a side of the horizontal portion 611, which contacts the second domain B, in a diagonal direction (e.g., upper left direction) with respect to the side thereof. Further, the rest of the second branch electrodes 601b may extend from a side of the vertical portion 612, which contacts the second domain B, in a diagonal direction with respect to the side thereof.

The third branch electrodes 601c may be provided in plural in the third domain C, and in this case, the plurality of third branch electrodes 601c may be aligned parallel to each other. In this regard, a part of the third branch electrodes 601c may extend from a side of the horizontal portion 611, which contacts the third domain C, in a diagonal direction (e.g., lower left direction) with respect to the side thereof. Further, the rest of the third branch electrodes 601c may extend from a side of the vertical portion 612, which contacts the third domain C, in a diagonal direction with respect to the side thereof.

The fourth branch electrodes 601d may be provided in plural in the fourth domain D, and in this case, the plurality of fourth branch electrodes 601d may be aligned parallel to each other. In this regard, a part of the fourth branch electrodes 601d may extend from a side of the horizontal portion 611, which contacts the fourth domain D, in a diagonal direction (e.g., lower right direction) with respect to the side thereof. Further, the rest of the fourth branch electrodes 601d may extend from a side of the vertical portion 612, which contacts the fourth domain D, in a diagonal direction with respect to the side thereof.

The aforementioned stem electrode 613 may further include a first connecting portion 614a and a second connecting portion 614b. The first connecting portion 614a is connected to an end portion of a side of the horizontal portion 611, and the second connecting portion 614b is connected to an end portion of another side of the horizontal portion 611. The first connecting portion 614a and the second connecting portion 614b may be aligned parallel to the vertical portion 612. The first connecting portion 614a and the second connecting portion 614b may be unitary with the stem electrode 613.

End portions of a part of the first branch electrodes 601a disposed in the first domain A and end portions of a part of the fourth branch electrodes 601d disposed in the fourth domain D may be connected to one another by the second connecting portion 614b. Likewise, end portions of a part of the second branch electrodes 601b disposed in the second domain B and end portions of a part of the third branch electrodes 601c disposed in the third domain C may be connected to each other by the first connecting portion 614a.

The first sub-pixel electrode PE1 and the storage electrode 752 may overlap each other. In an exemplary embodiment, an edge portion of the first sub-pixel electrode PE1 may be disposed on the first storage electrode 751.

The connecting portion between the first transistor TFT1 and the first sub-pixel electrode PE1 is disposed between the gate line GL and the first sub-pixel electrode PE1. In other words, the first drain contact hole CH1 is positioned between the gate line GL and the first sub-pixel electrode PE1.

The second sub-pixel electrode PE2 is disposed in the second sub-pixel region P2. In this case, as illustrated in FIG. 3, the second sub-pixel electrode PE2 is disposed on the capping layer 391. The second sub-pixel electrode PE2 is connected to the second drain electrode DE2 through the second drain contact hole CH2. The second sub-pixel electrode PE2 may include the same material as that included in the first sub-pixel electrode PE1. That is, the second sub-pixel electrode PE2 and the first sub-pixel electrode PE1 may be simultaneously provided in the same process.

The second sub-pixel electrode PE2 may have substantially the same configuration as that of the first sub-pixel electrode PE1. That is, the second sub-pixel electrode PE2 includes a stem electrode that divides the second sub-pixel region P2 into a plurality of domains, and a branch electrode extending from the stem electrode to each of the domains. Further, the second sub-pixel electrode PE2 may further include a first connecting portion and a second connecting portion. Since the stem electrode, the branch electrode, the first connecting portion, and the second connecting portion included in the second sub-pixel electrode PE2 are the same as those included in the first sub-pixel electrode PE1, descriptions pertaining thereto will make reference to descriptions described with reference to FIG. 4.

The second sub-pixel electrode PE2 and the second storage electrode 752 may overlap each other. In an exemplary embodiment, an edge portion of the second sub-pixel electrode PE2 may be disposed on the second storage electrode 752, for example.

The connecting portion between the second transistor TFT2 and the second sub-pixel electrode PE2 is disposed between the gate line GL and the second sub-pixel electrode PE2. In other words, the second drain contact hole CH2 is positioned between the gate line GL and the second sub-pixel electrode PE2.

Although not illustrated, the pixel may further include a shielding electrode. The shielding electrode may be disposed on the capping layer 391 to overlap the data line DL. The shielding electrode may include a material the same as that included in the first sub-pixel electrode PE1. In an exemplary embodiment, the common voltage may be applied to the shielding electrode.

The light shielding layer 376 is disposed on the second substrate 302. The light shielding layer 376 is disposed on a portion of the second substrate 302, except for a portion of the second substrate 302 corresponding to the first sub-pixel region P1 and the second sub-pixel region P2. In an alternative exemplary embodiment, the light shielding layer 376 may be disposed on the first substrate 301.

The overcoat layer 722 is disposed on the light shielding layer 376. In this case, the overcoat layer 722 may be disposed over an entire surface of the second substrate 302 including the light shielding layer 376. The overcoat layer 722 may remove a height difference between elements between the overcoat layer 722 and the second substrate 302 such as the aforementioned light shielding layer 376.

The common electrode 330 is disposed on the overcoat layer 722. In this case, the common electrode 330 may be disposed over an entire surface of the second substrate 302 on which the overcoat layer 722 is disposed. However, in an alternative exemplary embodiment, the common electrode 330 may be only disposed on portions of the overcoat layer 722 which correspond to the first sub-pixel region P1 and the second sub-pixel region P2. In an exemplary embodiment, the common voltage is applied to the common electrode 330.

Figure 5:
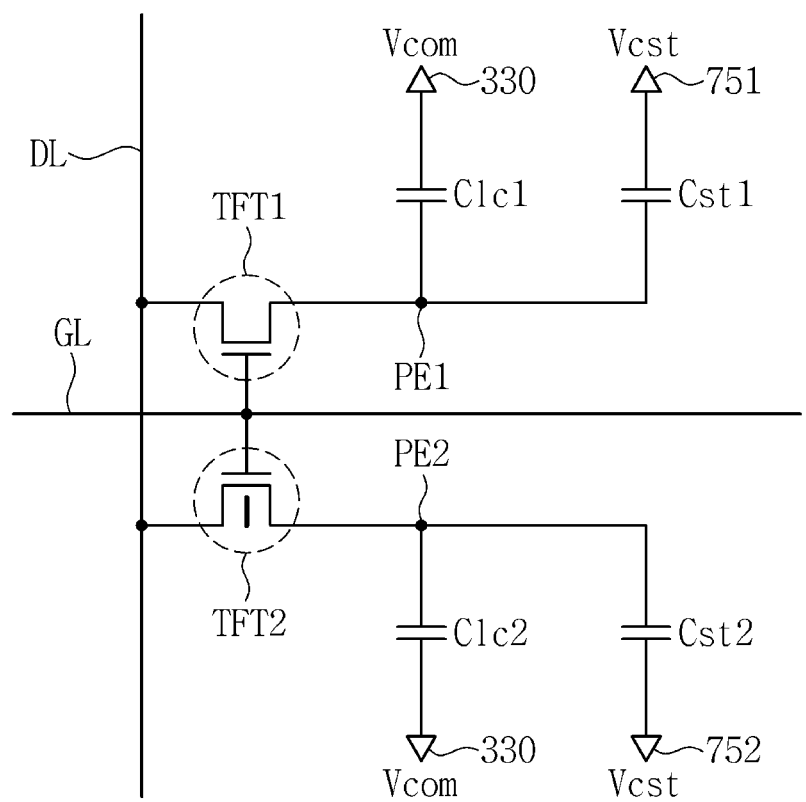
FIG. 5 is a view illustrating an equivalent circuit of a pixel of FIG. 1.
Figure 6:
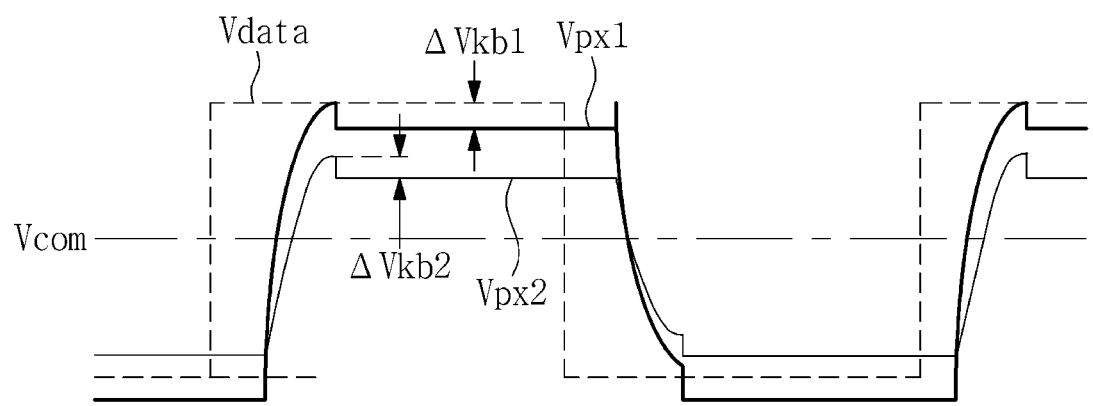
FIG. 6 is a view illustrating waveforms of a first pixel voltage and a second pixel voltage.

FIG. 5 is a view illustrating an equivalent circuit of the single pixel of FIG. 1, and FIG. 6 is a view illustrating waveforms of a first pixel voltage and a second pixel voltage.

The single pixel, as illustrated in FIG. 5, includes the first transistor TFT1, a first liquid crystal capacitor Clc1, a first storage capacitor Cst1, the second transistor TFT2, a second liquid crystal capacitor Clc1, and a second storage capacitor Cst2.

The first transistor TFT1 is controlled based on a gate signal applied from the gate line GL, and is connected between the data line DL and the first sub-pixel electrode PE1. The first transistor TFT1 is turned on by a gate high voltage of the gate signal to thereby apply a data signal applied from the data line DL to the first sub-pixel electrode PE1.

The first liquid crystal capacitor Clc1 includes the first sub-pixel electrode PE1 and the common electrode 330 that oppose each other. As described in the foregoing, the common voltage Vcom is applied to the common electrode 330.

The first storage capacitor Cst1 includes the first sub-pixel electrode PE1 and the first storage electrode 751 that oppose each other. As described in the foregoing, the storage voltage Vcst is applied to the first storage electrode 751. The storage voltage Vcst may correspond to the common voltage Vcom.

The second transistor TFT2 is controlled based on the gate signal applied from the gate line GL, and is connected between the data line DL and the second sub-pixel electrode PE2. The second transistor TFT2 is turned on by a gate high voltage of the gate signal to thereby apply a data signal applied from the data line DL to the second sub-pixel electrode PE2.

The second liquid crystal capacitor Clc2 includes the second sub-pixel electrode PE2 and the common electrode 330 that oppose each other.

The second storage capacitor Cst2 includes the second sub-pixel electrode PE2 and the second storage electrode 752 that oppose each other. As described in the foregoing, the storage voltage Vcst is applied to the second storage electrode 752. The storage voltage Vcst may correspond to the common voltage Vcom.

A level of the pixel voltage (hereinafter, "first pixel voltage") applied to the first sub-pixel electrode (PE1) through the first transistor TFT1 is defined as the following Equation 1.

$$Vpx1 = Vdata - \frac{C\_Cgs1}{C\_Cgs1 + C\_Clc1 + C\_Cst1} \Delta V_{gs} \quad \langle \text{Equation 1} \rangle$$

In the Equation 1, Vpx1 denotes the first pixel voltage, Vdata denotes an image data signal applied to the data line DL, C_Cgs1 denotes capacitance of a parasitic capacitor between the gate electrode GE and the source electrode SE of the first transistor TFT1, C_Clc1 denotes capacitance of the first liquid crystal capacitor Clc1, C_Cst1 denotes capacitance of the first storage capacitor Cst1, and $\Delta V_{gs}$ denotes a difference between the gate high voltage and the gate low voltage of the gate signal applied to the gate line GL. In the Equation 1, the expression "{C_Cgs1/(C_Cgs1+C_Clc1+C_Cst1)*$\Delta V_{gs}$}" denotes a kick-back voltage with respect to the image data signal applied to the first sub-pixel electrode PE1.

A level of the pixel voltage (hereinafter, "second pixel voltage") applied to the second sub-pixel electrode (PE2) through the second transistor TFT2 is defined as the following Equation 2.

$$Vpx2 = Vdata - \Delta Vt_{(FRT)} - \frac{1}{C_{gate}} \int_0^{T_{gate}} I_{FRT}(t)\,dt - \frac{C\_Cgs2}{C\_Cgs2 + C\_Clc2 + C\_Cst2}\Delta V_{gs} \quad \langle \text{Equation 2} \rangle$$

In the Equation 2, Vpx2 denotes the second pixel voltage, Vdata denotes the image data signal applied to the data line DL, $\Delta Vt_{(FRT)}$ denotes a threshold voltage of the second transistor TFT2, $C_{gate}$ denotes capacitance of the gate line GL, $T_{gate}$ denotes a time period during which the gate signal maintains the gate high voltage, $I_{FRT}$ denotes current flowing through the second transistor TFT2, C_Cgs2 denotes capacitance of a parasitic capacitor between the gate electrode GE and the source electrode SE of the second transistor TFT2, C_Clc2 denotes capacitance of the second liquid crystal capacitor Clc2, C_Cst2 denotes capacitance of the second storage capacitor Cst2, and $\Delta V_{gs}$ denotes a difference between the gate high voltage and the gate low voltage of the gate signal applied to the gate line GL. In the Equation 2, the expression "{C_Cgs2/(C_Cgs2+C_Clc2+C_Cst2)*$\Delta V_{gs}$}" denotes a kick-back voltage with respect to the image data signal applied to the second sub-pixel electrode PE2.

As it may be appreciated in Equations 1 and 2, and FIG. 6, the level of the second pixel voltage Vpx2 is less than the level of the first pixel voltage Vpx1. This is because the current flowing through the second transistor TFT2 is less than the current flowing through the first transistor TFT1. That is, since the second transistor TFT2 includes a floating electrode, the length of the channel of the second transistor TFT2 is longer than the length of the channel of the first transistor TF1. Accordingly, the amount of the current flowing through the second transistor TFT2 is less than the amount of the current flowing through the first transistor TFT1. Accordingly, although the data signal having the same level is applied to the first transistor TFT1 and the second transistor TFT2, respectively, the level of the first pixel voltage Vpx1 of the first sub-pixel electrode PE1 is different from the level of the second pixel voltage Vpx2 of the second sub-pixel electrode PE2. That is, the second pixel voltage Vpx2 generated by the second transistor TFT2 is less than the first pixel voltage Vpx1 generated by the first transistor TFT1. Accordingly, the level of the image data signal applied to the second sub-pixel electrode PE2 may be controlled without an additional voltage-dividing transistor provided in a conventional LCD device. Further, since the voltage-dividing transistor is not used, an aperture ratio of the pixel may increase. In addition, since the voltage-dividing transistor is not used, the data line DL and the storage electrodes 751 and 752 are not directly connected to one another, and thus variation of the storage voltage may be significantly reduced.

Figure 7:
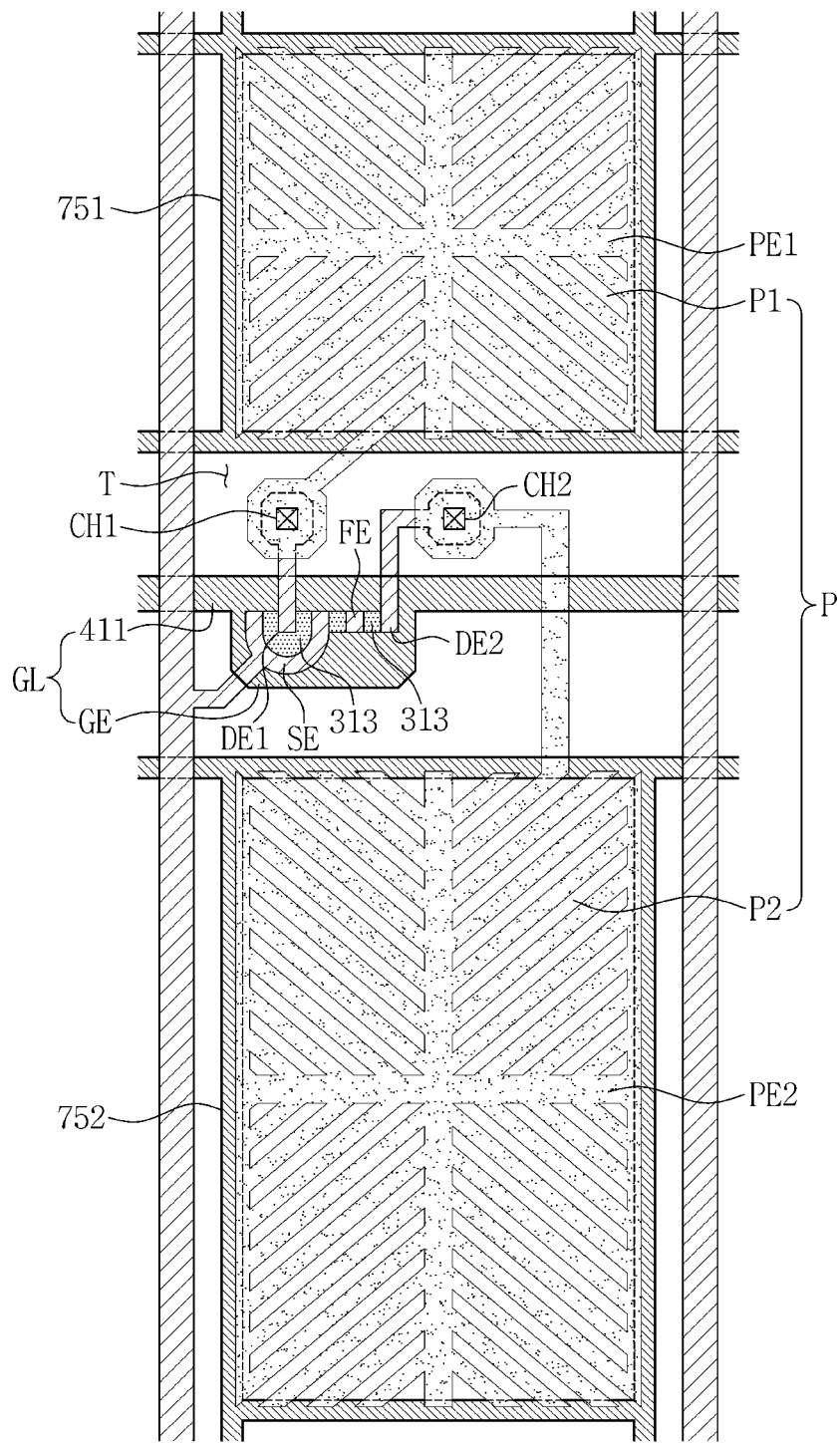
FIG. 7 is a plan view illustrating another exemplary embodiment of a pixel.

FIG. 7 is a plan view illustrating a pixel according to another exemplary embodiment.

According to a pixel configuration illustrated in FIG. 7, a connecting portion between the first transistor TFT1 and the first sub-pixel electrode PE1 is positioned between the gate line GL and the first sub-pixel electrode PE1. In other words, the first drain contact hole CH1 is positioned between the gate line GL and the first sub-pixel electrode PE1. Further, a connecting portion between the second transistor TFT2 and the second sub-pixel electrode PE2 is positioned between the gate line GL and the first sub-pixel electrode PE1. In other words, the second drain contact hole CH2 is positioned between the gate line GL and the first sub-pixel electrode PE1.

Components included in the pixel of FIG. 7 are substantially the same as those illustrated in FIG. 1, and thus descriptions pertaining to the components illustrated in FIG. 7 will make reference to descriptions described hereinabove with reference to FIG. 1.

Figure 8:
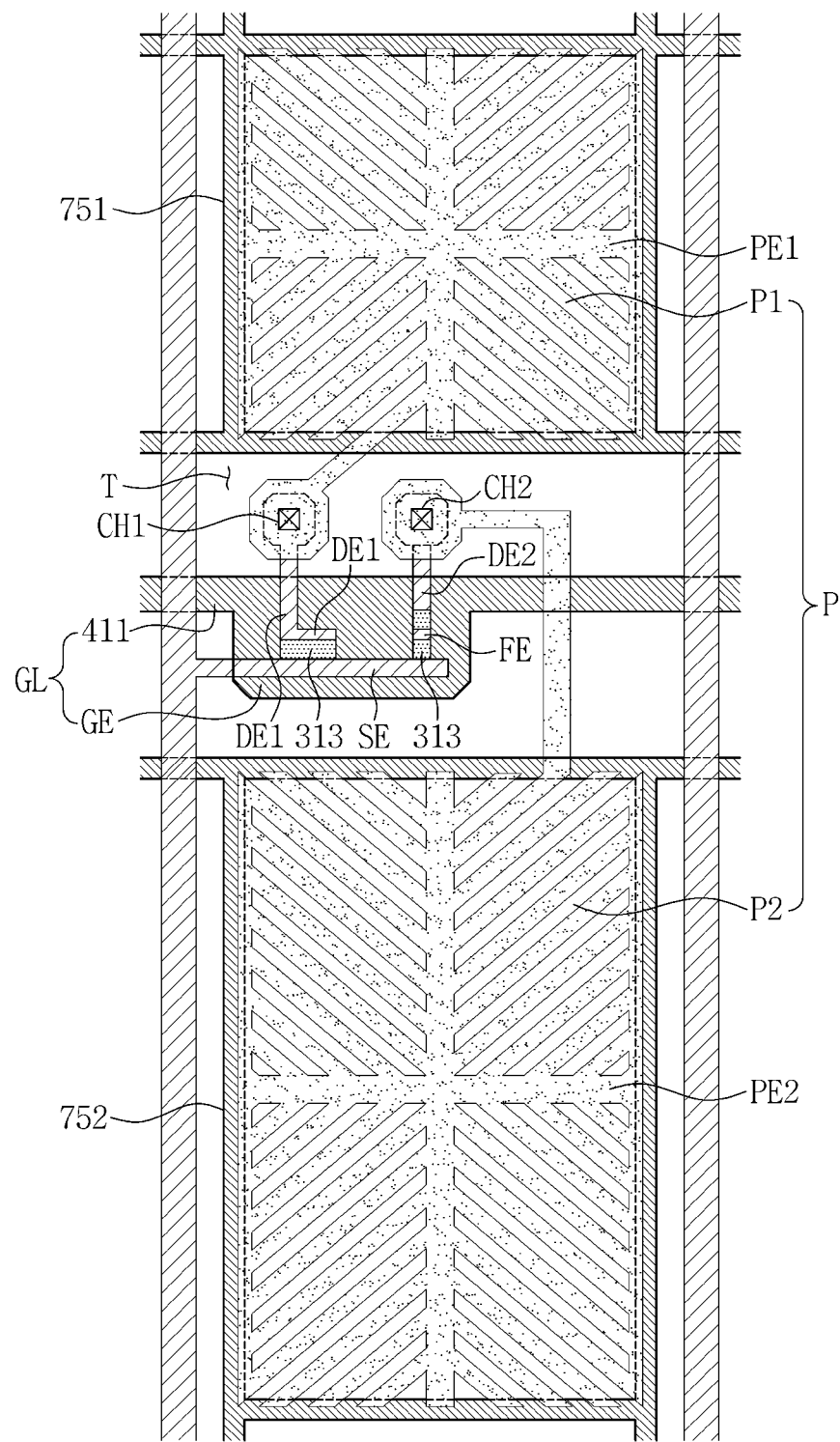
FIG. 8 is a plan view illustrating another exemplary embodiment of a pixel.

FIG. 8 is a plan view illustrating a pixel according to another exemplary embodiment.

According to a pixel configuration illustrated in FIG. 8, a connecting portion between the first transistor TFT1 and the first sub-pixel electrode PE1 is positioned between the gate line GL and the first sub-pixel electrode PE1. In other words, the first drain contact hole CH1 is positioned between the gate line GL and the first sub-pixel electrode PE1. Further, a connecting portion between the second transistor TFT2 and the second sub-pixel electrode PE2 is positioned between the gate line GL and the first sub-pixel electrode PE1. In other words, the second drain contact hole CH2 is positioned between the gate line GL and the first sub-pixel electrode PE1.

Further, according to the pixel configuration illustrated in FIG. 8, the source electrode has an I-shape.

Components included in the pixel of FIG. 8 are substantially the same as those illustrated in FIG. 1, and thus descriptions pertaining to the components illustrated in FIG. 8 will make reference to descriptions described hereinabove with reference to FIG. 1.

Figure 9:
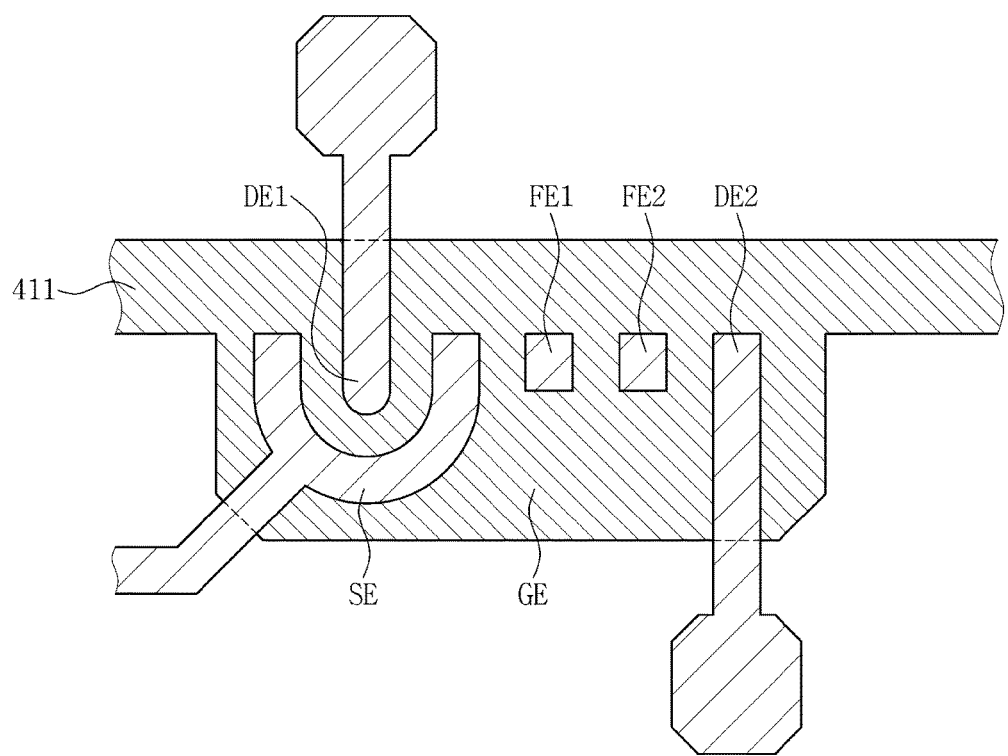
FIG. 9 is a view illustrating another structure of a second thin film transistor ("transistor")

FIG. 9 is a view illustrating another structure of the second transistor TFT2.

As illustrated in FIG. 9, the second transistor TFT2 may include a plurality of floating electrodes FE1 and FE2 that are separated from each other. The plurality of floating electrodes FE1 and FE2 are arranged in a line between the source electrode SE and the second drain electrode DE2. Accordingly, between the first floating electrode FE1 and the second floating electrode FE2, the first floating electrode FE1 is closer to the source electrode SE than the other (i.e., the second floating electrode FE2) is, and the second floating electrode FE2 is closer to the second drain electrode DE2 than the other (i.e., the first floating electrode FE1) is.

FIG. 9 illustrates two floating electrodes FE1 and FE2 by way of example, but in alternative exemplary embodiments, there may be two or more floating electrodes between the source electrode SE and the second drain electrode DE2.

Figure 10:
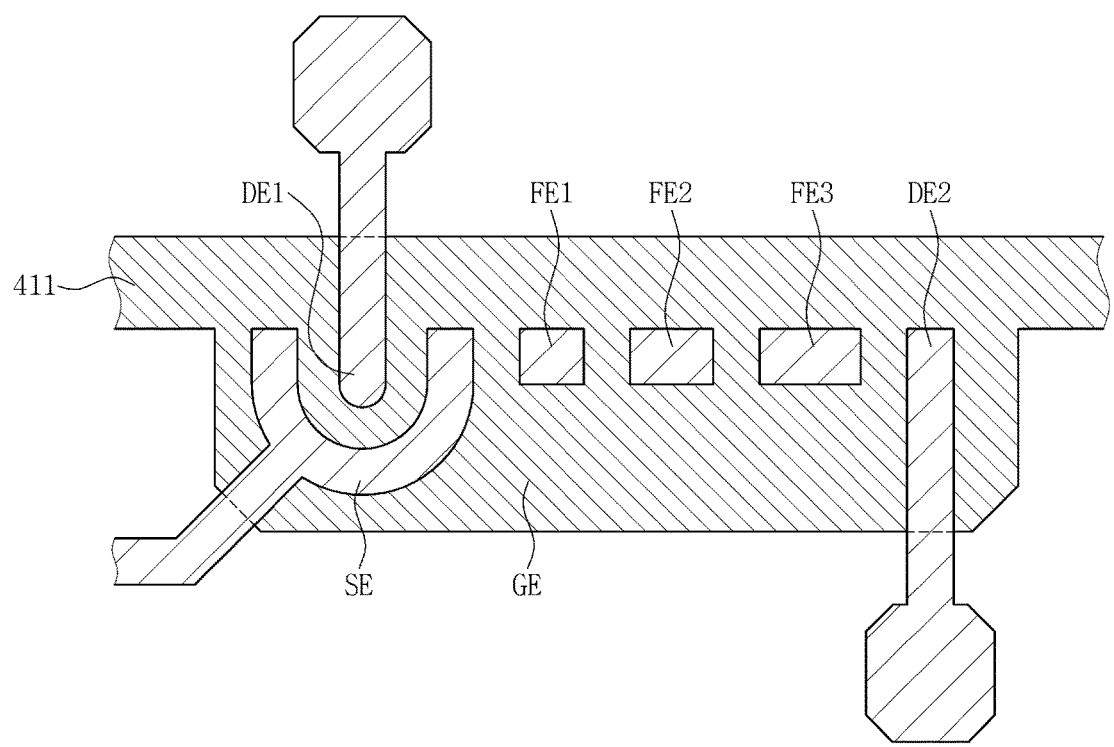
FIG. 10 is a view illustrating another structure of the second transistor.

FIG. 10 is a view illustrating another structure of the second transistor TFT2.

As illustrated in FIG. 10, the second transistor TFT2 may include a plurality of floating electrodes FE1, FE2, and FE3 that are separated from each other. The plurality of floating electrodes FE1, FE2, and FE3 are arranged in a line between the source electrode SE and the second drain electrode DE2. In this regard, at least two of the plurality of floating electrodes FE1, FE2, and FE3 may have different sizes from each other. In an exemplary embodiment, the second floating electrode FE2 may have a greater size that the size of the first floating electrode FE1, and the third floating electrode FE3 may have a greater size than the size of the second floating electrode FE2. In this case, the plurality of floating electrodes FE1, FE2, and FE3 may have a greater size, as being disposed closer to one of the source electrode SE and the second drain electrode DE2. FIG. 10 illustrates an an example in which the plurality of floating electrodes FE1, FE2, and FE3 have a greater size, as being disposed closer to the drain electrode DE2.

Figure 11:
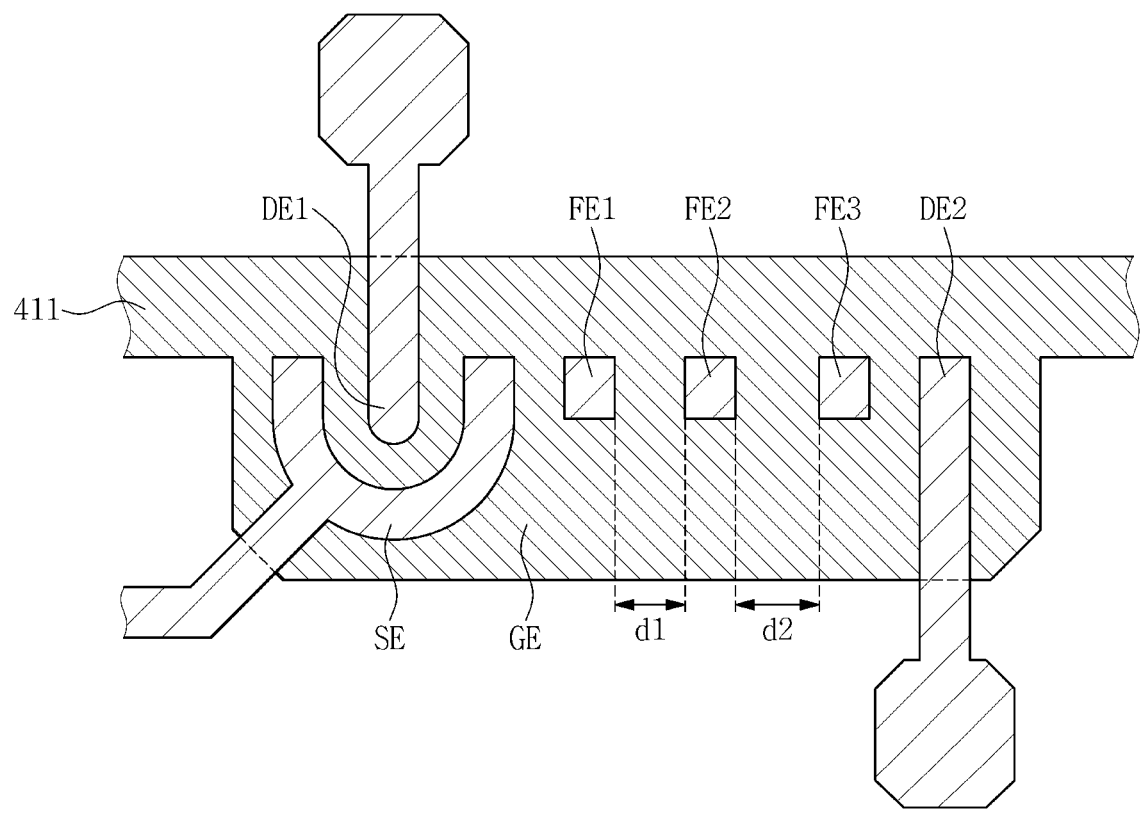
FIG. 11 is a view illustrating another structure of the second transistor.

FIG. 11 is a view illustrating another structure of the second transistor TFT2.

As illustrated in FIG. 11, the second transistor TFT2 may include a plurality of floating electrodes FE1, FE2, and FE3 that are separated from each other. The plurality of floating electrodes FE1, FE2, and FE3 are arranged in a line between the source electrode SE and the second drain electrode DE2. In this regard, an interval between one of the plurality of floating electrodes FE1, FE2, and FE3 and another thereof is different from an interval between the one of the plurality of floating electrodes FE1, FE2, and FE3 and another thereof. In an exemplary embodiment, an inverval d1 between the first floating electrode FE1 and the second floating electrode FE2 may be less than an interval d2 between the first floating electrode FE1 and the third floating electrode FE3. In this regard, when two floating electrodes adjacent to each other are defined as a pair of floating electrodes, the pair of the floating electrodes may have a greater interval, as being disposed closer to one of the source electrode SE and the second drain electrode DE2. In an exemplary embodiment, in a case where one of the two adjacent floating electrodes, of the plurality of floating electrodes, is disposed closest to the second drain electrode DE2, an interval between the two floating electrodes may be the greatest.

The second transistors TFT2 of the pixels respectively illustrated in FIGS. 1, 7, and 8 may be substituted with the second transistors illustrated in FIGS. 9, 10, and 11.

As set forth above, the LCD device according to exemplary embodiments has the following effects.

The level of a data signal applied to a second sub-pixel electrode may be controlled using only a transistor including a floating electrode, without an additional voltage-dividing transistor provided in a conventional LCD device. Accordingly, an aperture ratio of a pixel may increase. Further, the level of the data signal may be controlled by capacitance of a parasitic capacitor, and not by internal resistance of the transistor, such that control of the level of the data signal may be more easily achieved.

Also, the voltage-dividing transistor is absent in the LCD device as described hereinabove, the data line and the storage electrode may not be directly connected. Accordingly, variation of the storage voltage may be significantly reduced. Accordingly, occurrence of horizontal crosstalk caused by voltage drop (IR drop) of the storage voltage may be suppressed.

From the foregoing, it will be appreciated that various embodiments in accordance with the disclosure have been described herein for purposes of illustration, and that various modifications may be made without departing from the scope and spirit of the teachings. Accordingly, the various exemplary embodiments disclosed herein are not intended to be limiting of the true scope and spirit of the teachings. Various features of the above described and other exemplary embodiments can be mixed and matched in any manner, to produce further exemplary embodiments consistent with the invention.

What is claimed is:

1. A liquid crystal display device comprising:
   a first substrate;
   a second substrate opposing the first substrate;
   a liquid crystal layer between the first substrate and the second substrate;
   a gate line, a data line, a first sub-pixel electrode, and a second sub-pixel electrode on the first substrate;
   a first transistor connected to the gate line, the data line, and the first sub-pixel electrode and comprising a source electrode, a drain electrode, and no floating electrode between the source electrode and the drain electrode; and
   a second transistor connected to the gate line, the data line, and the second sub-pixel electrode and comprising a source electrode, a drain electrode, and at least one floating electrode between the source electrode and the drain electrode.

2. The liquid crystal display device of claim 1, wherein a plurality of floating electrodes separated from each other is disposed between the source electrode and the drain electrode.

3. The liquid crystal display device of claim 2, wherein the plurality of floating electrodes is arranged in a line between the source electrode and the drain electrode.

4. The liquid crystal display device of claim 3, wherein one of the plurality of floating electrodes, more than at least another of the plurality of floating electrodes, is disposed adjacent to the source electrode.

5. The liquid crystal display device of claim 4, wherein at least two of the plurality of floating electrodes have sizes different from each other.

6. The liquid crystal display device of claim 5, wherein the plurality of floating electrodes has a greater size, as being disposed closer to one of the source electrode and the drain electrode.

7. The liquid crystal display device of claim 5, wherein an interval between one of the plurality of floating electrodes and another of the plurality of floating electrodes is different from an interval between the one of the plurality of floating electrodes and another of the plurality of floating electrodes.

8. The liquid crystal display device of claim 7, wherein a pair of the floating electrodes has a greater interval, as being disposed closer to one of the source electrode and the drain electrode.

9. The liquid crystal display device of claim 1, wherein the at least one floating electrode overlaps a semiconductor layer of the second transistor.

10. The liquid crystal display device of claim 1, wherein the first transistor and the second transistor share the source electrode.

11. The liquid crystal display device of claim 1, wherein the source electrode has one of a U-shape and an I-shape.

12. The liquid crystal display device of claim 1, wherein a curved portion of the source electrode having a U-shape faces the second sub-pixel electrode.

13. The liquid crystal display device of claim 1, wherein a connecting portion between the first transistor and the first sub-pixel electrode is disposed between the gate line and the first sub-pixel electrode.

14. The liquid crystal display device of claim 13, wherein a connecting portion between the second transistor and the second sub-pixel electrode is disposed between the gate line and the second sub-pixel electrode.

15. The liquid crystal display device of claim 13, wherein a connecting portion between the second transistor and the second sub-pixel electrode is disposed between the gate line and the first sub-pixel electrode.

16. The liquid crystal display device of claim 1, further comprising a first storage electrode along at least one side of the first sub-pixel electrode.

17. The liquid crystal display device of claim 1, further comprising a second storage electrode along at least one side of the second sub-pixel electrode.

18. The liquid crystal display device of claim 1, wherein the first sub-pixel electrode comprises:
   a first stem electrode; and
   a first branch electrode extending from the first stem electrode.

19. The liquid crystal display device of claim 1, wherein the second sub-pixel electrode comprises:
   a second stem electrode; and
   a second branch electrode extending from the second stem electrode.

* * * * *